United States Patent [19]
Coyne et al.

[11] Patent Number: 5,556,588
[45] Date of Patent: Sep. 17, 1996

[54] SYSTEM AND METHOD FOR APPLYING A BLADDER RELEASE BETWEEN A GREEN TIRE AND A BLADDER IN A TIRE MOLDING MACHINE

[75] Inventors: Mike S. Coyne, Danvile, Va.; Stanley A. Crisp, Lillington, N.C.; Jim E. Newman, Ringgold, Va.

[73] Assignee: The Goodyear Tire & Rubber Company, Akron, Ohio

[21] Appl. No.: 369,748

[22] Filed: Jan. 6, 1995

[51] Int. Cl.⁶ .............................. B28B 17/00; B29C 35/00
[52] U.S. Cl. ................ 264/130; 222/505; 239/DIG. 21; 264/315; 264/326; 425/38; 425/96; 425/107; 184/6.26
[58] Field of Search .................................. 425/29, 38, 96, 425/107, 92; 264/315, 326, 130; 222/505; 239/DIG. 21; 184/6.26

[56] References Cited

U.S. PATENT DOCUMENTS

4,329,265  5/1982  Hallenbeck .
4,778,060  10/1988  Wessner, Jr. ............................ 425/29
5,205,378  4/1993  Boelkins .

*Primary Examiner*—Mathieu D. Vargot
*Attorney, Agent, or Firm*—Howard M. Cohn; T. P. Lewandowski

[57] ABSTRACT

Apparatus and methods for automatically spraying a mist of mold release into the space between a tire and a bladder in a tire molding machine so that the mold release covers the outer surface of the bladder or the interior surface of the tire and does not get onto the walls of the mold.

14 Claims, 10 Drawing Sheets

SYSTEM AND METHOD FOR APPLYING A BLADDER RELEASE BETWEEN A GREEN TIRE AND A BLADDER IN A TIRE MOLDING MACHINE

FIELD OF THE INVENTION

This invention relates to the field of tire manufacture and more particularly, the invention relates to a system and method for applying a bladder release between a green tire and a bladder in a tire molding machine.

In the manufacture of tires, typically used for automobiles and trucks, a green tire (one which is already formed but not cured) is placed in an open mold within a conventional tire pressure molding machine. The tire is positioned about a deflated bladder disposed within the mold section of the molding machine. After, the tire mold is closed and sealed, the bladder is inflated to force the green tire against the heated mold walls whereby the tire is formed with a tread pattern. After some period of time, the tire is cured, the bladder is deflated, the mold is opened, and the now cured tire ejected from the mold. In the past, the bladder sometimes stuck to the tire after the molding operation was completed and the bladder was deflated. Then, a machine operator would have to manually separate the bladder from the interior wall of the tire before the completed tire could be ejected and a new green tire inserted. This caused a costly, time consuming delay in the manufacturing process.

To overcome this problem, a machine operator would often spray a coating of bladder release to either the inside surface of the green tire or the external surface of the bladder with a paint gun prior to loading the green tire within the pressure molding machine and inflating the bladder. While this technique was effective to insure that the bladder would separate from the cured tire when the molding process was completed, it was still time consuming because it required the machine operator to individually spray each tire or bladder before the green tire was loaded into the molding machine. Further, the machine operator had to carefully apply the bladder release to ensure that the bladder release completely covered the interface surface between the tire and the bladder so that the bladder wouldn't stick to a section of tire. Besides being a costly, time consuming process, which could possibly slow the production of tires, it was also subject to operator error. These errors include: not every tire being sprayed, inconsistencies in application of the bladder release causing the bladder to stick against uncoated sections of the tire, and overspray of the bladder release. Oversprayed bladder release typically resulted from the pressure of the bladder release being sprayed on the bladder. The excess bladder release often got into the mold and contaminated the mold walls, especially because of the tendency for dirt to cling to the viscous bladder release. This contamination necessitated the need to stop the tire production line more often and clean the molds, another time consuming costly delay. Furthermore, the system was not adaptable to modern manufacturing techniques where the entire process is handled by machines and robots.

It became apparent that an apparatus and method of operating the apparatus was needed to prevent the sticking of the bladder to the inside walls of cured tires without the use of a machine operator and the time delays associated therewith.

OBJECTS AND SUMMARY OF THE INVENTION

It is an object of the present invention to provide a system and method for applying a bladder release between a green tire and a bladder in a tire molding machine which obviate the problems and limitations of the prior art systems.

It is a further object of the present invention to provide an improved system and method for applying a mist or spray of bladder release between a green tire and a bladder in a tire molding machine after the green tire has already been loaded within the tire molding machine.

It is a still further object of the present invention to provide an improved system and method for spraying a mist of bladder release between a green tire and a bladder in a tire molding machine so that the bladder release does not get onto the interior walls of the mold portion of the tire molding machine.

Yet another object of the present invention to provide an improved system and method for automatically applying a bladder release to both a green tire and a bladder in a tire molding machine without the use of a machine operator.

According to the invention, a tire molding machine for curing a green tire includes a tire mold having an inflatable bladder therein for pressing the green tire against the sides of the tire mold. The molding machine includes a tire loader having a plurality of tire loading paddles for picking up and loading the green tire into the tire mold about the bladder. A lubricating system is mounted on at least one and typically each of a plurality of loading paddles. The lubricating system directs a mist of the bladder release into the space formed between the tire and the bladder.

According to the invention, the lubricating system includes a bladder release supply mounted to the tire loader, a plurality of bladder release feed tubes secured to each of the plurality of loading paddles, and a nozzle extending through each of the plurality of loading paddles for spraying the mist of bladder release between the green tire and the bladder. Preferably, the nozzles spray the bladder release directly towards the bladder or tire.

Also according to the invention, the method of curing a green tire in a tire molding machine comprises the steps of: picking up a green tire with tire loading paddles; lowering the green tire with the tire loading paddles about an inflatable bladder disposed within the tire mold of the tire molding machine; spraying a mist or cloud of mold release into the space between the tire and the bladder; releasing the green tire within the tire mold from the plurality of tire loading paddles; and raising the tire loading paddles.

The method of the invention also includes spraying a mist of the bladder release from each of the plurality of loading paddles directly against either the inner surface of the green tire or the bladder.

BRIEF DESCRIPTION OF THE DRAWINGS

The structure, operation, and advantages of the presently preferred embodiment of the invention will become further apparent upon consideration of the following description taken in conjunction with the accompanying drawings, wherein.

DETAILED DESCRIPTION OF THE INVENTION

Figure 1:
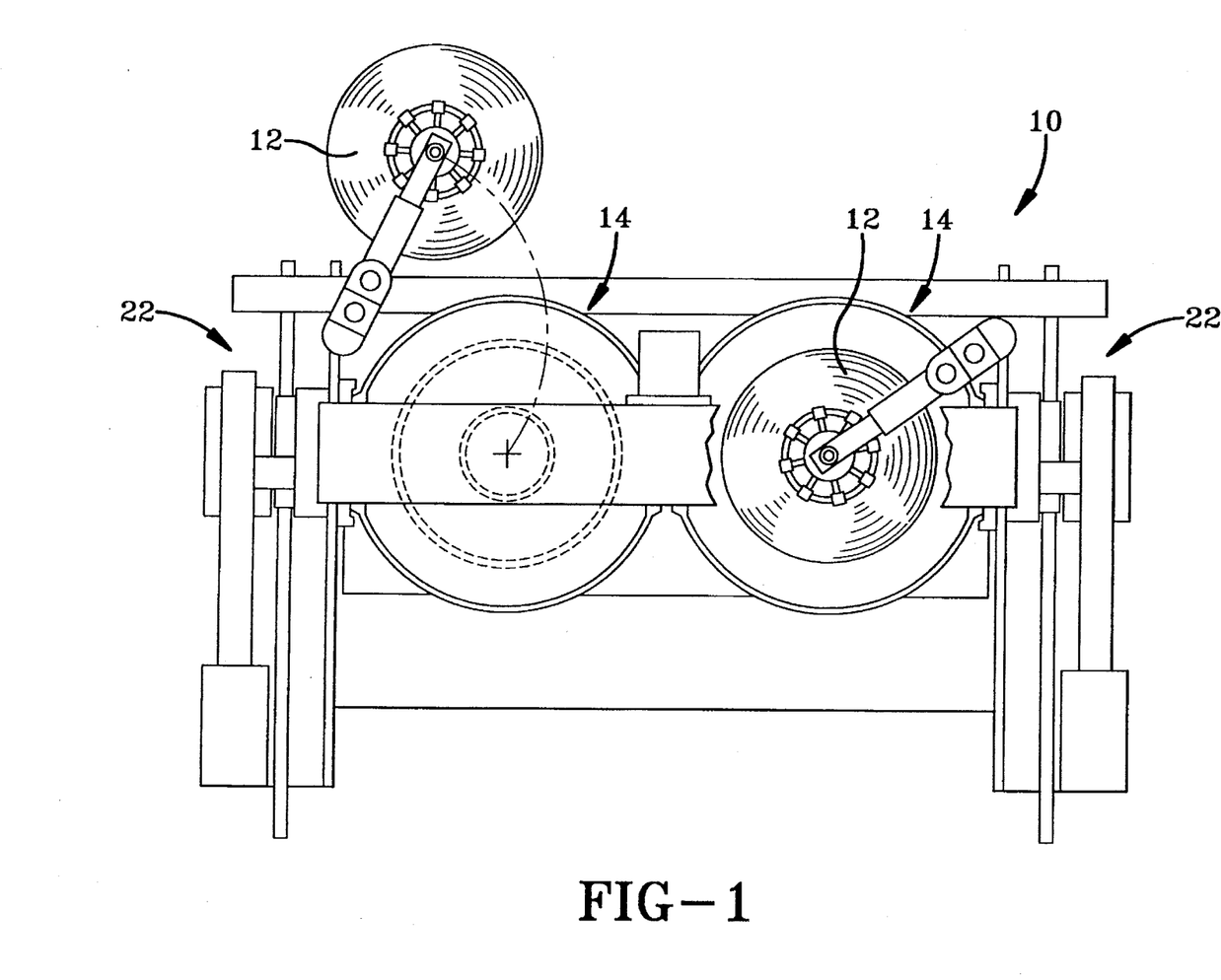
FIG. 1 is a plan view of a tire molding machine, in accordance with the invention.
Figure 2:
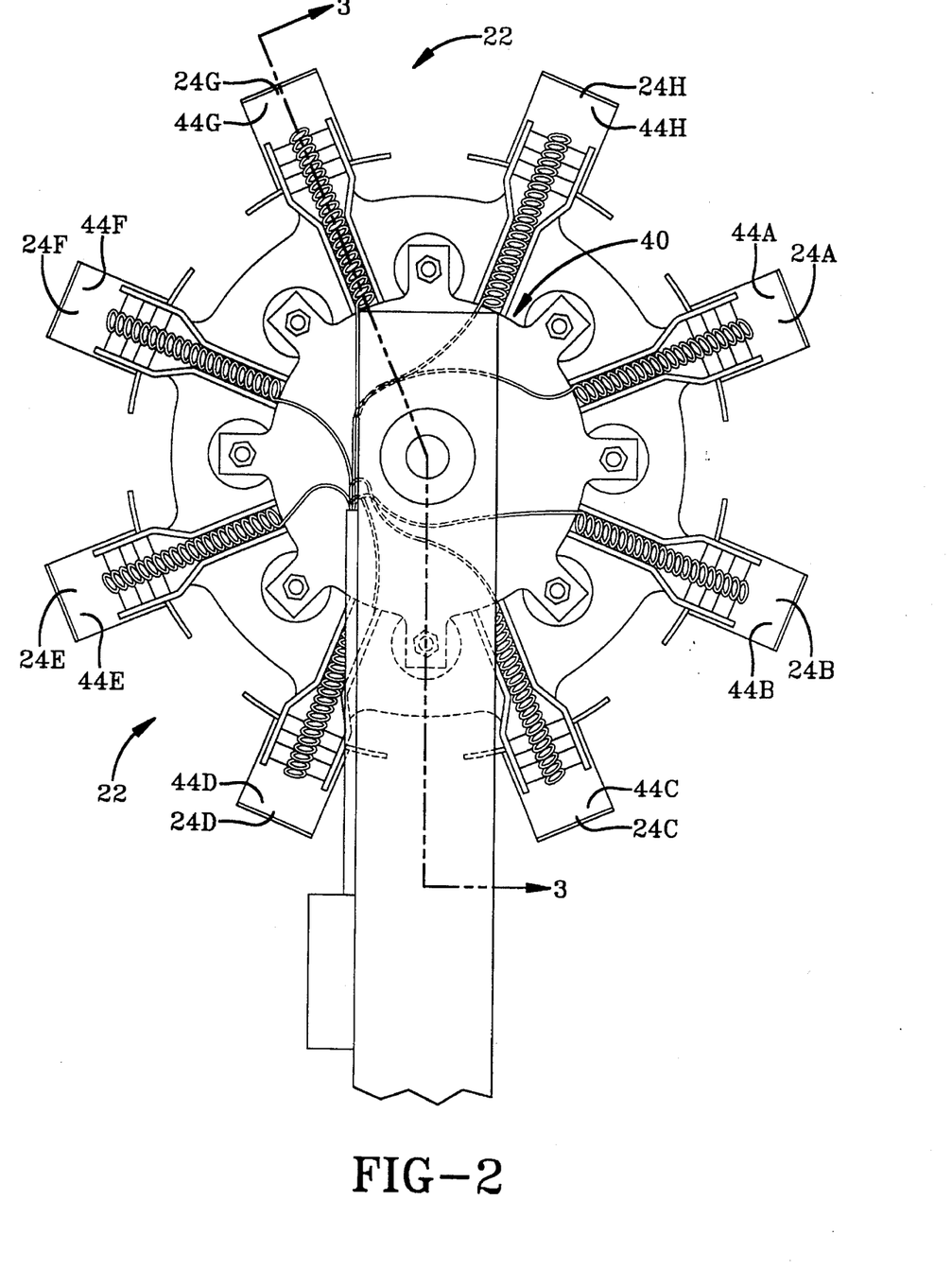
FIG. 2 is a plan view of the tire loader of a tire molding machine, as shown in FIG. 1, having eight tire loading paddles.
Figure 6:
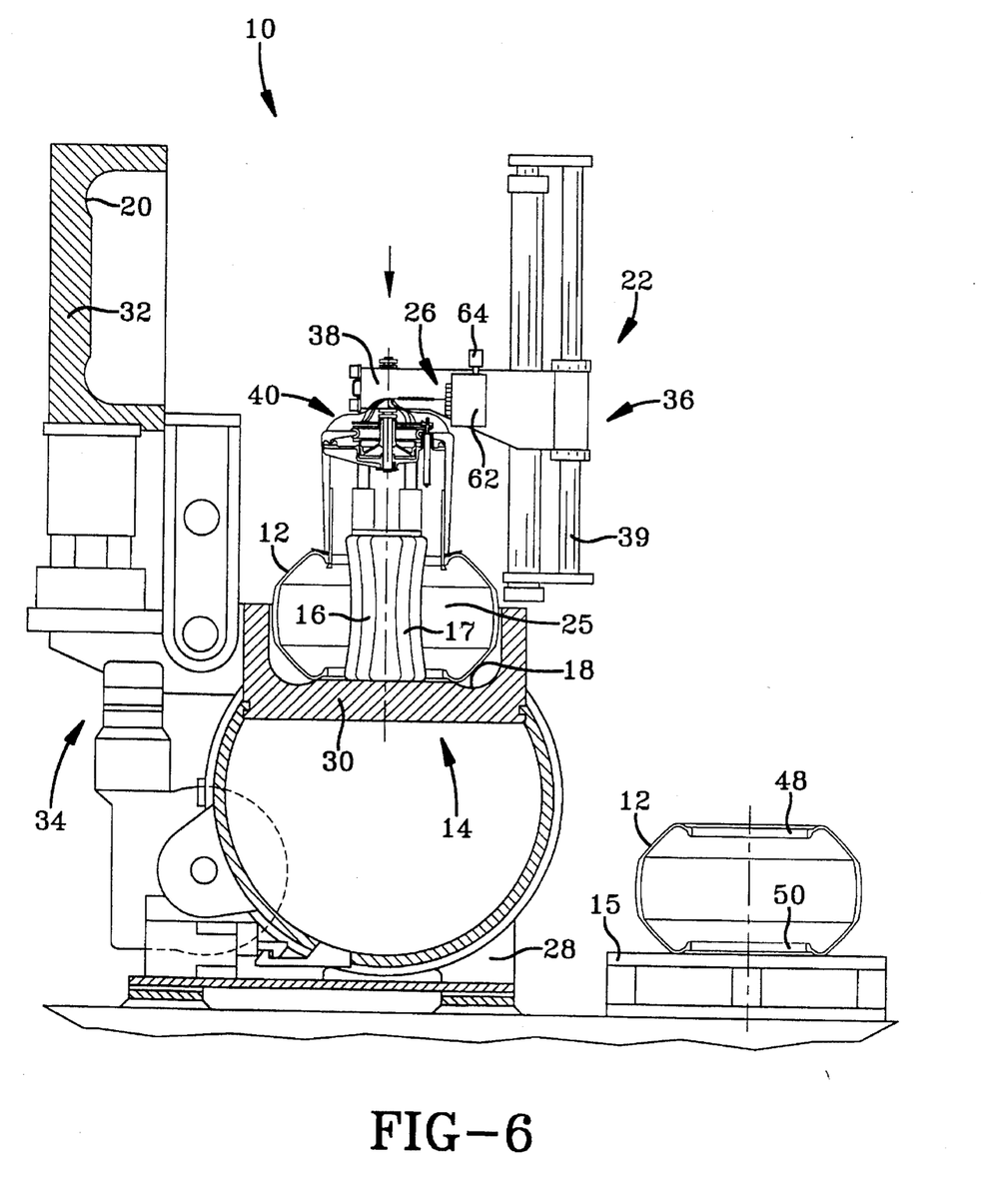
FIG. 6 is a side elevational view, partly in cross section, illustrating the tire molding machine of FIG. 1, with the green tire on a tire loader positioned on the bladder after being loaded into the mold.
Figure 7:
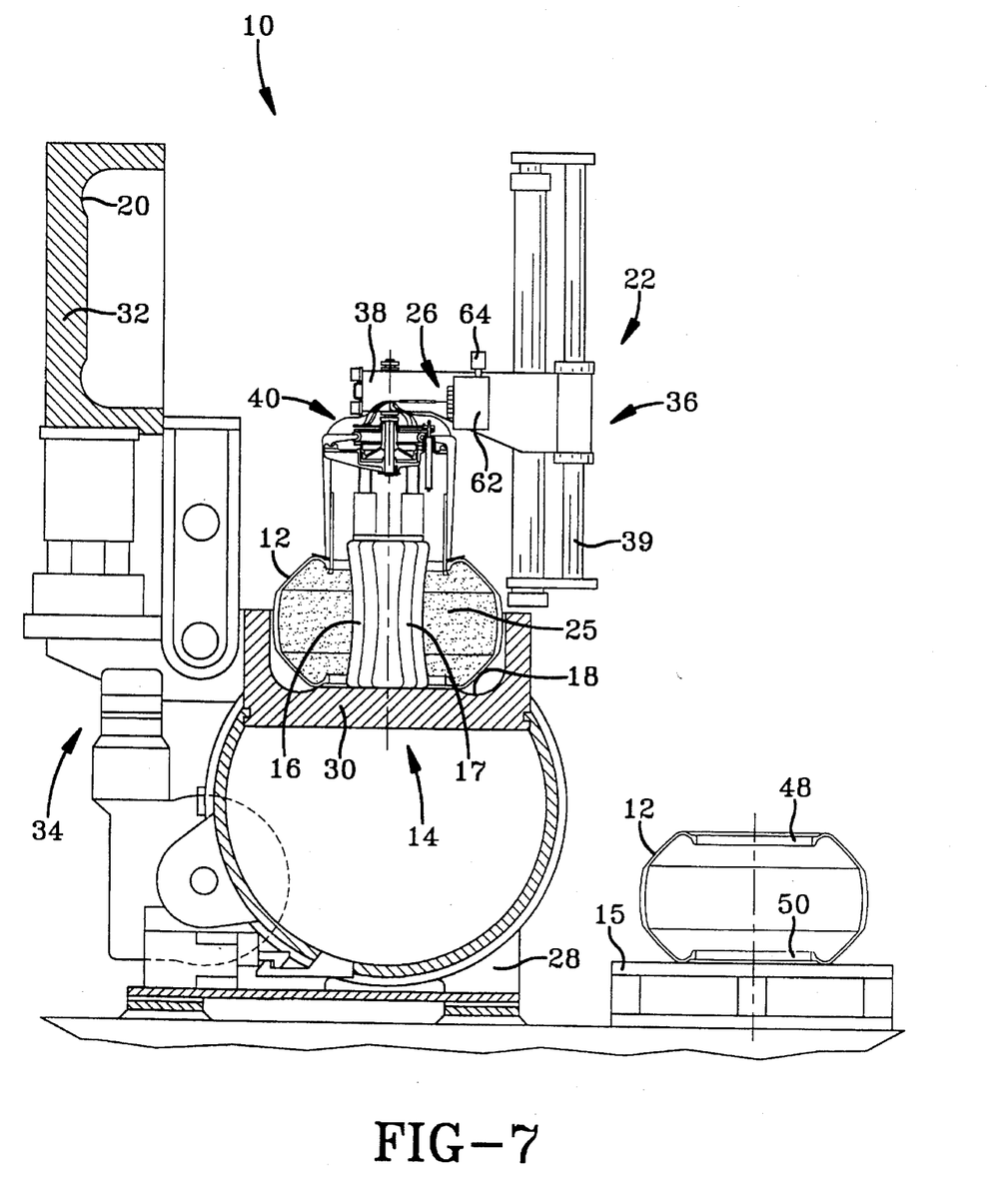
FIG. 7 is a side elevational view, partly in cross section, illustrating the tire molding machine of FIG. 1, after a mist of bladder release is sprayed into the space between the green tire and the bladder.
Figure 9:
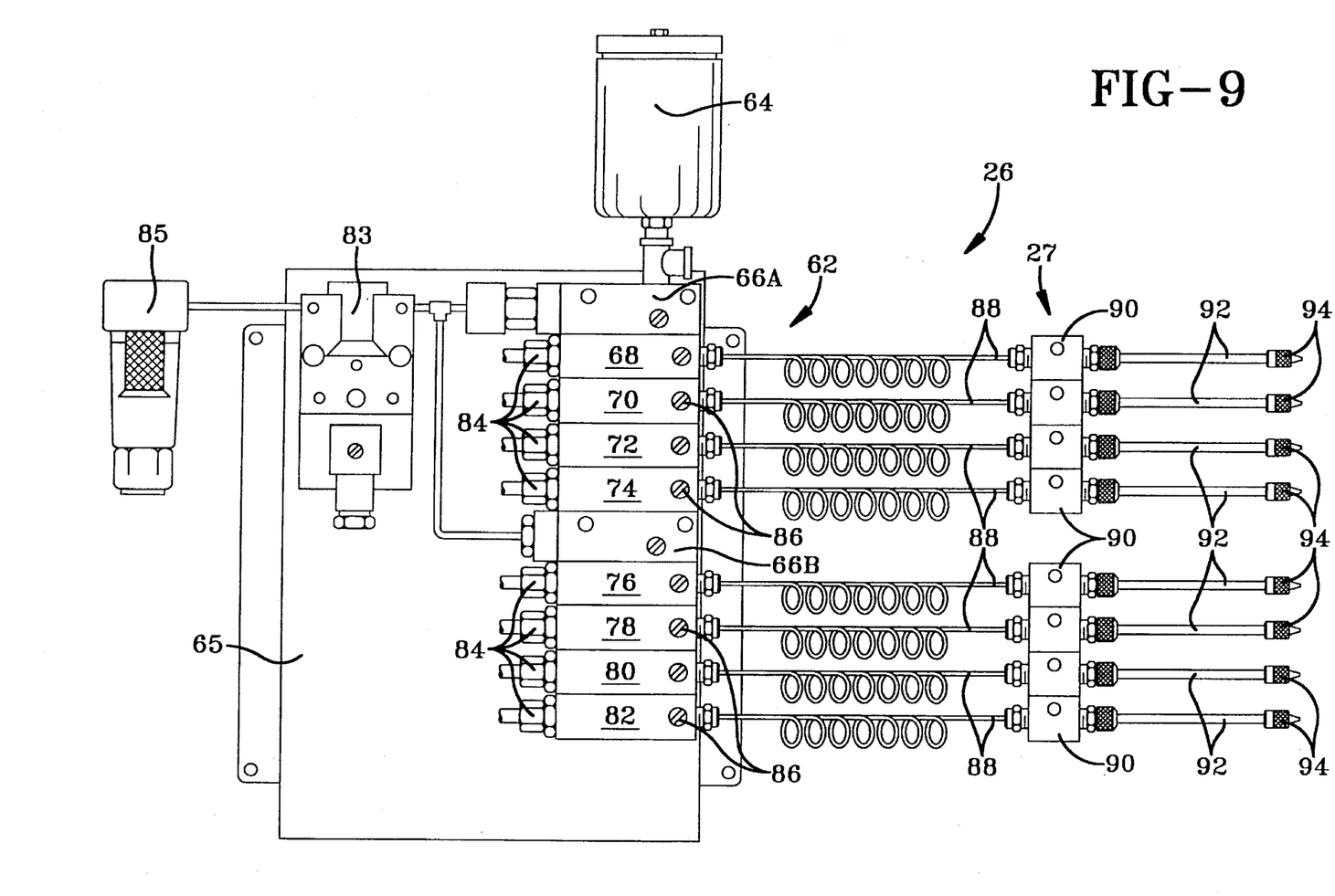
FIG. 9 shows an enlarged view of the lubrication system of the present invention.

Referring to FIGS. 1 and 4–7, a tire molding machine 10 is shown for curing a green tire 12 within a tire mold 14 having an inflatable bladder 16 for pressing green tire 12 against the inwardly facing surfaces 18 and 20 of tire mold 14. A tire loader 22, as shown in FIG. 2, includes a plurality of tire loading paddles 24A, 24B, 24C, 24D, 24E, 24G, 24H (24A–24H) for picking up a green tire 12 from a storage station, such as a platform 15, and loading it into tire mold 14. A lubricating system 26 is mounted on tire loader 22 and preferably has a lubrication delivery section 27, as shown in FIG. 9, secured to each of the plurality of tire loading paddles (24A–24H) for applying a bladder release or lubricant in the enclosed space 25 between green tire 12 and bladder 16, as shown in FIGS. 6 and 7.

As shown in FIGS. 4–7, tire molding machine 10 has a base support 28 onto which is secured tire mold 14. Mold 14 has a bottom section 30 and a top section 32 shown in its upright, open position. A mechanism 34 for opening and closing mold 14 is schematically illustrated. Mechanism 34 operates by pivoting closed the top section 32 and lowering it against the bottom section 30 where it is sealed in place. Alternatively, mechanism 34 raises top section 32 away from bottom section 30 and then pivots the former open to a position as shown in FIGS. 4–7. Since the opening and closing of mold 14 is not an important aspect of the present invention, mechanism 34 is shown schematically and not described in detail herein.

An inflatable bladder 16 having an outwardly facing surface 17 is mounted within mold 14 and preferably secured to bottom section 30. The inflatable bladder 16 can be inflated with air from a supply (not shown) and deflated as required. The inflatable bladder 16 is typically constructed of rubber or an elastomer.

Figure 3:
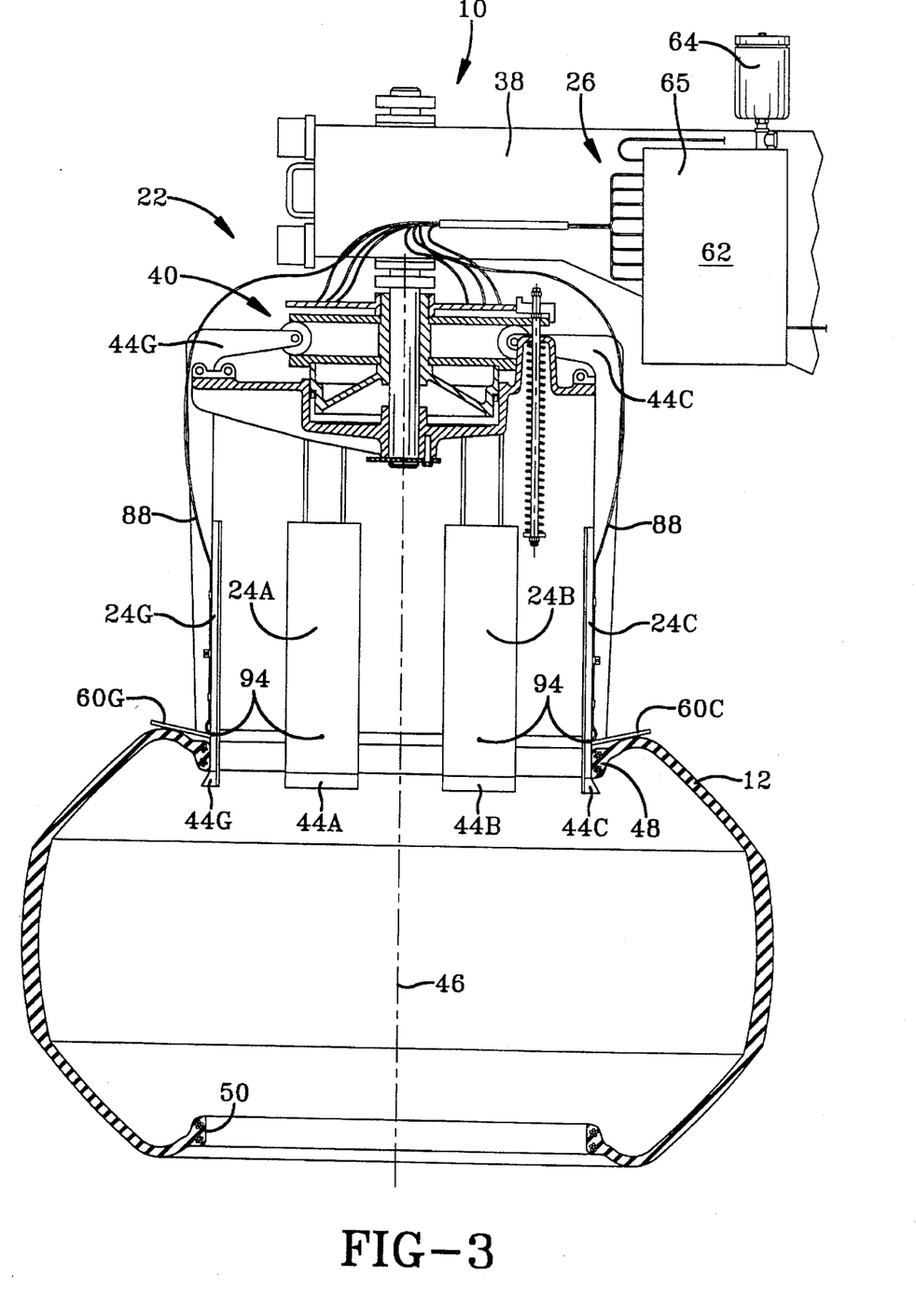
FIG. 3 is a side elevational view, partly in cross section, through line 3—3 of FIG. 2 showing loading paddles of the tire loader gripping a green tire.
Figure 4:
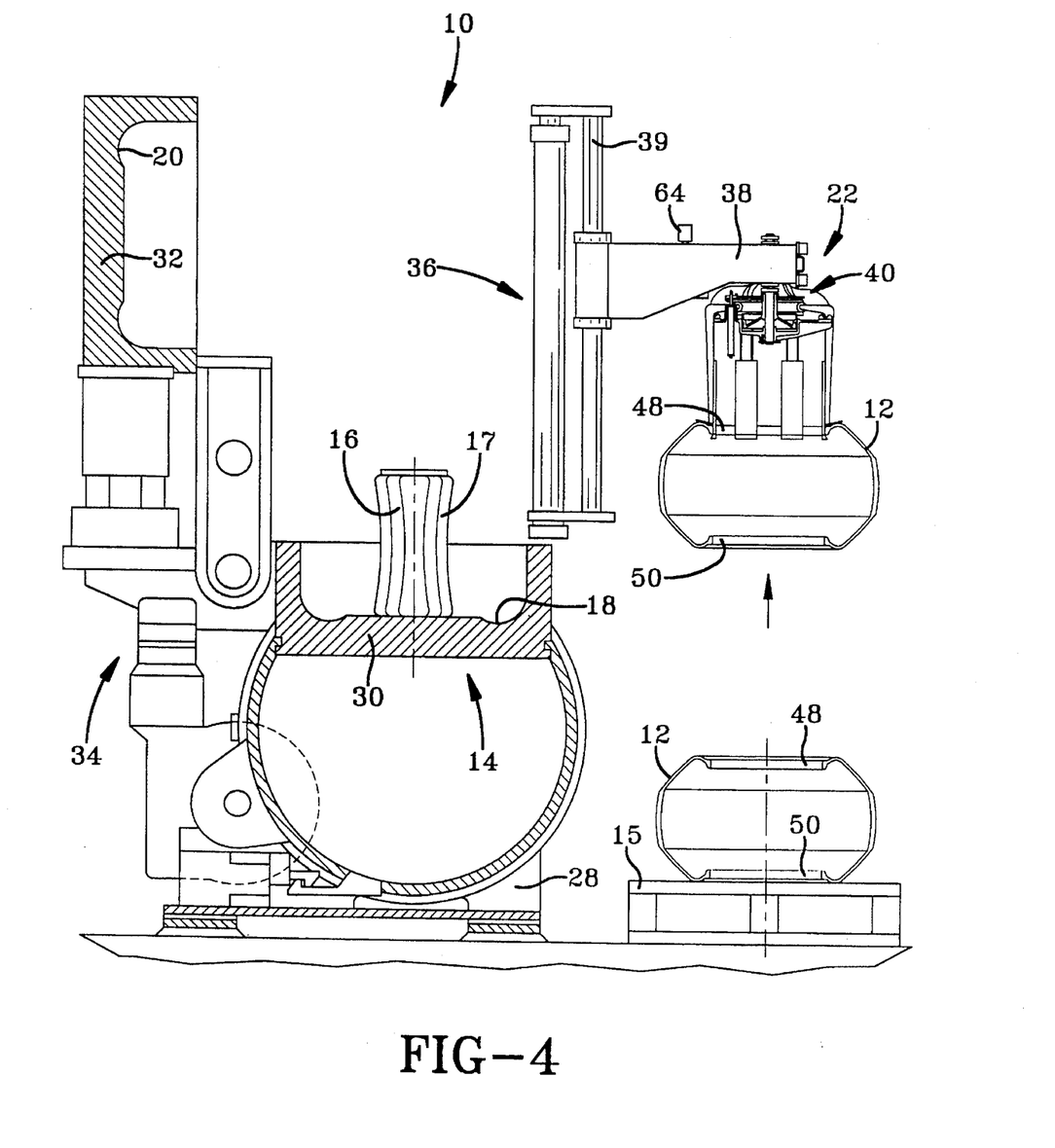
FIG. 4 is a side elevational view, partly in cross section, illustrating the tire molding machine of FIG. 1, and a green tire on a tire loader, prior to being loaded into the mold.
Figure 5:
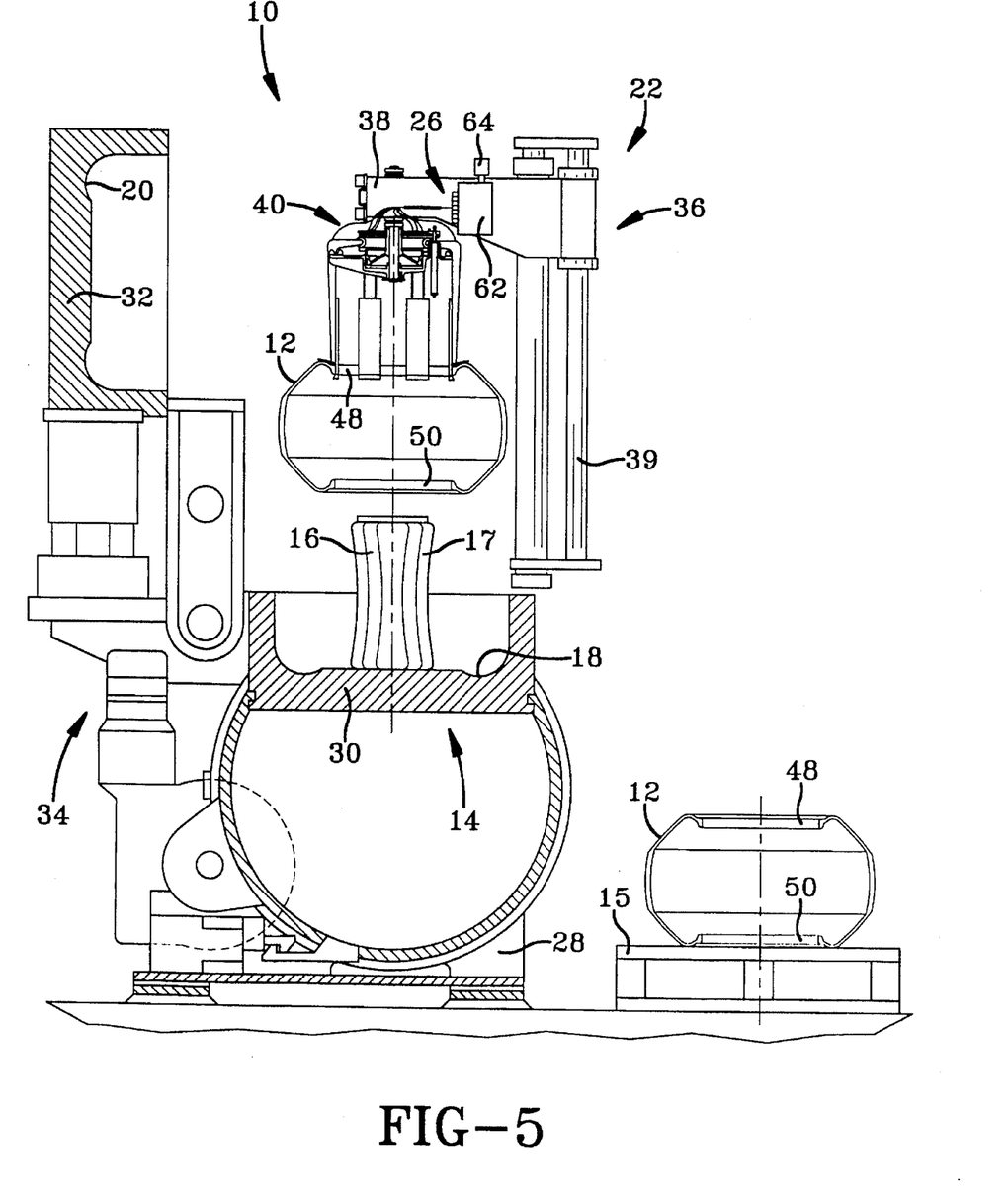
FIG. 5 is a side elevational view, partly in cross section, illustrating the tire molding machine of FIG. 1, with the green tire on a tire loader positioned directly above the bladder, just prior to being loaded into the mold.

Tire loader 22 includes an upright support 36 which is secured at its lower end to the base support 28. Support 36 includes a movable support structure 38 which both moves up and down and pivots about a rod 39. The tire loader paddles 24A–24H are secured at their upper ends to a support arm operator 40 which in turn is mounted to movable support structure 38. The upper end sections 42A, 42B, 42C, 42D, 42E, 42F, 42G, 42H (42A–42H) of support arms 24A–24E, as shown in FIG. 3, are pivotally mounted to support arm operator 40 so that the lower end sections 44A, 44B, 44C, 44D, 44E, 44F, 44G, 44H (44A–44H) of support arms 24A–24E move radially outward and toward a center line 46. When the lower end sections 44A–44H are closest to centerline 46, the effective diameter of a circle formed about the outwardly facing surface of the lower end sections 44A–44H of paddles 24A–24E is smaller than the diameter of the openings 48 and 50 formed on either side of the tire 12 so that lower end sections (44A–44H) can be easily inserted and/or removed from the opening 48 of tire 12. Conversely, when the lower end sections 44A–44H are moved outward from centerline 46, until the effective diameter of a circle formed about the outwardly facing surfaces of the lower end sections 44A–44H of paddles 24A–24E is larger than the diameter of the openings 48 and 50 formed on either side of tire 12, the lower end sections (44A–44H) then press against the circular surface forming the opening 48 to securely grip tire 12 so that the tire can be picked up and loaded into mold 14 as necessary.

Figure 8:
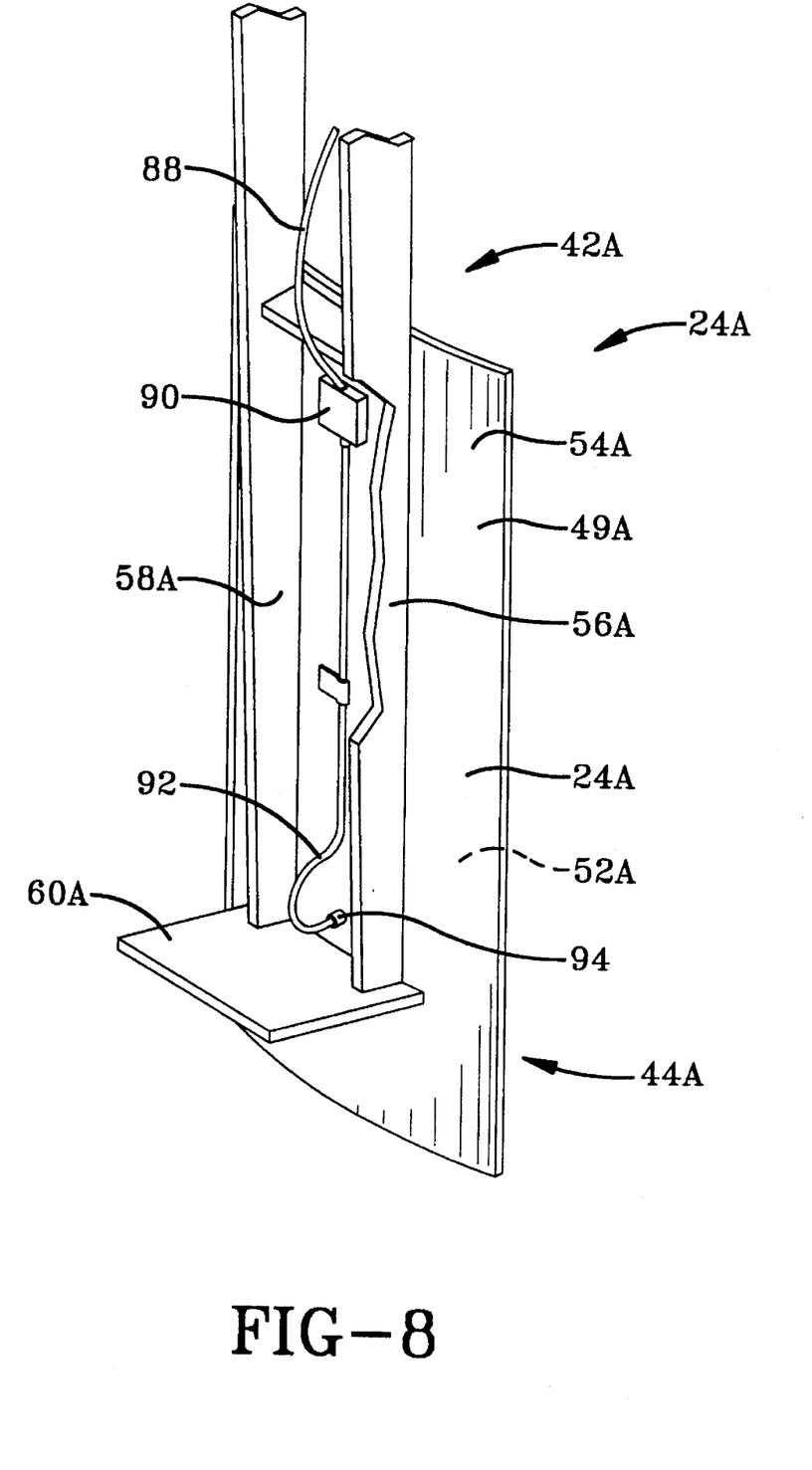
FIG. 8 shows an enlarged view of a loading paddle of the loading machine incorporating a feed line and nozzle of the lubrication system of the present invention.

Referring to FIG. 8, a detailed illustration of a tire loader paddle 24A is provided. Since all of the loader paddles 24A–24H are substantially identical, only a description of paddle 24A is included herein. Paddle 24A has a curved, elongated plate section 49A with an inwardly facing curved surface 52A that faces center line 46 and an outwardly facing curved surface 54A mounted onto two elongated plates 56A and 58A. The upper ends of plates 56A and 58A form upper end sections 42A and are pivotally secured to support arm operator 40. The lower ends of plates 56A and 58A are abutted against a stop plate 60A which extends substantially perpendicularly outward from the outwardly facing curved surface 54A of plate section 49A. Typically, paddle 24A is inserted downward into the opening 48 of tire 12 and moved into the tire until the stop plate 60A is abutted against the side wall of tire 12. Then, the upper end sections 42A–42H are pivoted outward and away from centerline 46, until the lower end sections 44A–44H of the elongated plate sections, such as end sections 44A, 44B, 44C, and 44G, shown in FIG. 3, frictionally engage the surface forming the opening 48 of green tire 12 to securely grip the tire and enable it to be raised or lowered as it is loaded or removed from mold 14.

A principle feature of this invention is the provision of a lubricating system 26 which includes a fluid dispenser 62, such as a UNI-MAX nozzle unit by UNI-MIST of Grand Rapids, Mich., as shown in FIG. 9. Fluid dispenser 62 includes an enclosure 65 containing eight separate nozzle units 68, 70, 72, 74, 76, 78, 80, 82 (68–82) stacked on one another. Enclosure 65 is shown in FIG. 3 mounted on movable support structure 38 of tire loader 22. It is however, within the terms of the invention to mount dispenser 62 at some other location on or even adjacent the tire machine 10. Fluid dispenser 62 includes a reservoir 64 of liquid bladder release and has two air pulse generators 66A, 66B (66B not shown) actuated by a solenoid valve 83 drawing air through an air filter 85. The air pulse generators 66A, 66B add air to the liquid bladder release from reservoir 64 to atomize the bladder release being transferred to the eight nozzle units 68–82. Eight injector-liquid adjustment knobs 84, one for each nozzle unit 68–82, independently adjusts the liquid output and air metering screws 86 control the flow of air. Flexible capillary tubes 88 are connected at one end to individual nozzle units 68–82 and at the other end to a coupling 90, which in turn is secured to the tire loading paddles 24A–24H. A delivery tube 92, is attached at one end to coupling 90 and at the other end to a nozzle 94. The nozzle 94 is mounted in a throughhole which extends through the lower ends 44A–44H of plate sections 48A–48H of support paddles 24A–24H, such as adjacent the intersection of plate section 48A with stop plate 60A. Preferably, the nozzles 94 are positioned so that the spray is emitted at a downward directed angle, with respect to the inner surface of each plate section 48A–48H.

In operation, the movable support structure 38 initially moves downward along rod 39 with the tire loading paddles 24A–24H in a contracted position so that the lower ends 44A–44H can enter opening 48 of tire 12 resting on surface 15 until the stop plates 60A–60H engage the upward facing side surface of the tire. Then, the paddles 24A–24H expand and frictionally engage the surface of opening 48 of the tire 12. Next, the movable support structure 38 returns upward along rod 39 into the position shown in FIG. 4. Support structure 38 then rotates about rod 39 so that tire 12 is positioned above the bottom section 30 of mold 14 with the lower opening 50 through tire 12 directly above the collapsed, inflatable bladder 16. Next, support structure 38 begins to move downward so that the stop plates press against the upward facing wall of tire 12 and seat the bead formed about the tire opening 50 against the bottom section 30 of mold 14. Simultaneously with the latter step, the lubricating system 26 is activated and a mist of mold release is sprayed from each nozzle 94 against the outer facing surface 17 of the collapsed bladder 16. Typically, the space 25 confined between the inner surface of tire 12 and the outer surface 17 of bladder 16 is filled with the mist of mold release. As top section 32 begins to rotate and close against the bottom section 30 of mold 14, the paddles 24A–24H begin to retract towards the centerline 46 and move upward and away from the inner surface 18 of the bottom mold section 30. The support structure 38 continues to move upward until the loading paddles 24A–24H are free from opening 48 and above bladder 16 so that the top section 32 of mold 14 can close and seal mold 14 for the curing process.

An important aspect of the invention is that nozzles 94 are directed towards the collapsed bladder 16 so that the spray effectively covers the entire surface 17 of the bladder. It is, however, within the scope of the invention to direct the spray away from the bladder 16 so that the bladder release has more of a tendency to fill the enclosed space 25 between the bladder 16 and the inner surface of the tire. Another advantage of the invention is that the bladder release is sprayed after the tire 12 is placed on the inflatable bladder 16. This reduces the possibility of the bladder release being able to escape from the enclosed space 25 between the bladder 16 and the interior surface of the tire and onto the interior surface of the mold which tends to contaminate the mold and require more frequent cleaning. After the top section 32 of mold 14 is secured and sealed onto the bottom section 30 of mold 14, the inflatable bladder 16 is inflated to force the green tire 12 against the interior mold walls 18,20. After a specified amount of time required to cure the tire, the bladder 16 is deflated and the mold 14 is opened. Finally, the cured tire is ejected and the process begins again.

Figure 10:
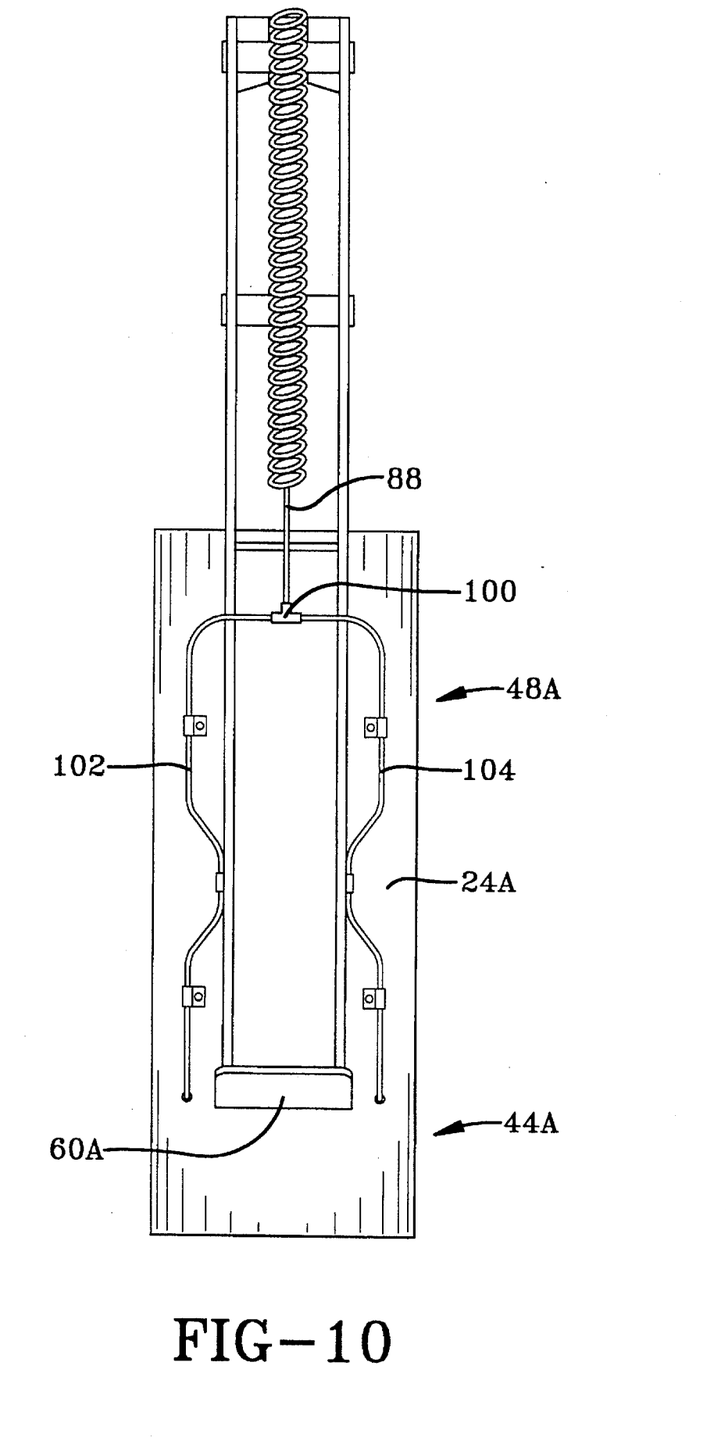
FIG. 10 is an enlarged view of a loading paddle of the tire loader incorporating an alternative embodiment of the lubrication system.

Referring to FIG. 10, there is illustrated an example of an alternative embodiment of the invention where two nozzles 94' are mounted in throughholes which extends through the lower end 44A of plate section 48A of support paddle 24A to better insure an even distribution of the bladder release spray in the enclosed space between the bladder and the green tire. Throughout the specification primed numbers represent structure elements which are substantially identical to structure elements represented by the same unprimed number. Preferably, each of the throughholes is disposed between the longitudinal edges of the plate section and the sides of the stop plate 60A. The nozzles 94 are preferably positioned so that the spray is emitted at a downward directed angle with respect to the inner surface of the plate section 44A.

The lubricating system 26 is essentially identical to that shown in FIG. 9 up to the flexible capillary tubes 88 which are connected at one end to individual nozzle units 68–82, as shown in FIG. 8. However, the other end of capillary tubes 88 are connected to a coupling 100, which in turn is secured to the tire loading paddles 24A–24H. Two delivery tubes 102 and 104 are each attached at one end to coupling 90 and at the other end to a nozzle 94. The nozzles 94 are secured within through holes which extend through the plate section so that the spray of bladder release is emitted as previously discussed.

It is apparent that there has been provided in accordance with this invention a system and method for applying a bladder release between a tire and a bladder in a tire molding machine which obviate the problems and limitations of the prior art systems. According to the invention, a mist of bladder release is automatically sprayed into the space between a tire and a bladder in a tire molding machine so that the bladder release covers the outer surface of the bladder and/or the inner surface of the green tire without getting onto the walls of the mold.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

We claim:

1. In a tire molding machine for curing a green tire including a tire mold having an inflatable bladder therein for pressing the green tire against an inner surface of said tire mold, and a tire loader for picking up said green tire and loading said green tire into said tire mold about said inflatable bladder, the improvement comprising;

a lubricating system mounted to said tire loader for automatically spraying a bladder release into a space between said green tire and said inflatable bladder, said lubricating system including one or more spray nozzles which are removably disposed in said space between said green tire and said inflatable bladder.

2. The system of claim 1 wherein:

said tire loader includes a plurality of tire loading paddles; and said lubricating system is mounted to said tire loader to direct a mist of said bladder release sprayed from said one or more spray nozzles mounted to at least one of said plurality of loading paddles into said space between said green tire and said inflatable bladder.

3. The system of claim 2 wherein said lubricating system directs said mist from said one or more spray nozzles mounted to one or more of said plurality of loading paddles into said space between said green tire and said inflatable bladder.

4. The system of claim 3 wherein said lubricating system includes:

a bladder release supply connected to one end of a plurality of bladder release feed tubes each secured to one of said plurality of loading paddles; and one of said nozzles each connected to an opposite end of each of said feed tubes, each of said nozzles extending through one of said plurality of loading paddles for spraying said mist of said bladder release into said space between said green tire and said inflatable bladder.

5. The system of claim 4 wherein each of said nozzles is directed toward said inflatable bladder to spray said bladder release onto said bladder.

6. The system of claim 4 wherein each of said plurality of loading paddles has one of said nozzles extending therethrough.

7. The system of claim 4 wherein each of said plurality of loading paddles has two of said nozzles extending therethrough.

8. The method of curing a green tire in a tire molding machine comprising the steps of:

loading said green tire with a tire loader about an inflatable bladder disposed within a tire mold of said tire molding machine;

automatically spraying a bladder release from a lubricating system having one or more spray nozzles mounted on said tire loader into a confined space between said green tire and said inflatable bladder, said bladder release being sprayed through said one or more spray nozzles which are removably disposed within said confined space;

releasing said green tire within said tire mold from said tire loader; and raising said tire loader away from said tire mold.

9. The method of claim 8 wherein the step of automatically spraying said bladder release from a lubricating system mounted on said tire loader includes spraying bladder release from each of a plurality of loading paddles.

10. The method of claim 9 including the step of spraying said bladder release through a nozzle mounted on at least one of a plurality of loading paddles comprising said tire loader into said confined space between said green tire and said inflatable bladder.

11. The method of claim 10 including the step of spraying said bladder release directly onto said inflatable bladder.

12. The method of claim 10 including the step of spraying said bladder release directly onto the interior surface of said green tire.

13. The method of claim 9 including the step of spraying said bladder release through two spaced nozzles mounted on each of said plurality of loading paddles into said confined space between said green tire and said inflatable bladder.

14. The method of claim 9 including the step of spraying said bladder release onto both an interior surface of said green tire and onto said inflatable bladder.

* * * * *